US010926661B2

(12) United States Patent
Bolger et al.

(10) Patent No.: US 10,926,661 B2
(45) Date of Patent: Feb. 23, 2021

(54) TRANSIENT BATTERY POWER MANAGEMENT

(71) Applicant: Ford Global Technologies, LLC, Dearborn, MI (US)

(72) Inventors: Bryan Michael Bolger, Canton, MI (US); Elaine Y. Chen, Dearborn, MI (US); Zachary March, Pinckney, MI (US); Matthew Allen Tomai, Clawson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 16/134,374

(22) Filed: Sep. 18, 2018

(65) Prior Publication Data

US 2020/0086748 A1 Mar. 19, 2020

(51) Int. Cl.
*B60L 58/12* (2019.01)
*H01M 10/44* (2006.01)
*H02J 7/00* (2006.01)
*B60L 53/00* (2019.01)
*H01M 10/42* (2006.01)

(52) U.S. Cl.
CPC .............. *B60L 58/12* (2019.02); *B60L 53/00* (2019.02); *H01M 10/44* (2013.01); *H02J 7/00* (2013.01); *H02J 7/0078* (2013.01); *H02J 7/00718* (2020.01); *H01M 2010/4271* (2013.01); *H02J 7/0048* (2020.01)

(58) Field of Classification Search
CPC .......... B60L 58/12; B60L 53/00; B60L 58/14; B60L 58/15; B60L 53/14; B60L 1/00; H02J 7/00; H02J 7/00718; H02J 7/0078; H02J 7/0048; H02J 7/0029; H02J 7/0068; H01M 10/44; H01M 2010/4271
See application file for complete search history.

(56) References Cited

U.S. PATENT DOCUMENTS

| | | | | |
|---|---|---|---|---|
| 6,348,277 B1 * | 2/2002 | Faris | ...................... | H01M 12/08 429/404 |
| 6,641,943 B1 * | 11/2003 | Faris | ...................... | H01M 12/06 429/402 |
| 6,980,912 B2 * | 12/2005 | Patino | ................... | H02J 7/0047 702/63 |
| 8,030,900 B2 * | 10/2011 | Hussain | ................ | H02J 7/0069 320/135 |
| 8,207,740 B2 | 6/2012 | Lin et al. | | |
| 8,359,133 B2 * | 1/2013 | Yu | ........................ | B60L 15/2045 701/22 |
| 8,692,496 B2 * | 4/2014 | McGrogan | .............. | B60L 58/15 318/434 |
| 8,731,752 B2 * | 5/2014 | Yu | ........................... | B60L 58/12 701/22 |
| 9,184,625 B1 * | 11/2015 | Sauvage | ................... | H02J 7/35 |

(Continued)

*Primary Examiner* — Mohammad K Islam
(74) *Attorney, Agent, or Firm* — David B Kelley; Brooks Kushman PC

(57) ABSTRACT

A vehicle includes a processor programmed to create a virtual energy bucket for a battery, and set a short-term power limit corresponding to the virtual energy bucket that defines a discharge limit for the battery. The virtual energy bucket fills responsive to an output power of the battery being below a first power threshold and depletes responsive to the output power being above a second power threshold.

18 Claims, 4 Drawing Sheets

(56) References Cited

U.S. PATENT DOCUMENTS

| | | | |
|---|---|---|---|
| 9,189,056 B2* | 11/2015 | Rahal-Arabi | G06F 1/3234 |
| 9,193,266 B2* | 11/2015 | Arumugam | F03D 9/32 |
| 9,246,340 B2* | 1/2016 | Shilimkar | G06F 1/32 |
| 9,257,859 B2* | 2/2016 | Nassar | H02J 7/0068 |
| 9,266,443 B2* | 2/2016 | Payne | G01C 21/3469 |
| 9,345,883 B2* | 5/2016 | Marnfeldt | H02J 7/025 |
| 9,385,543 B2 | 7/2016 | Kachi | |
| 9,415,698 B2* | 8/2016 | Sato | B60W 20/10 |
| 9,430,008 B2* | 8/2016 | Li | G06F 1/3212 |
| 9,561,792 B2* | 2/2017 | Kodawara | B60W 30/18009 |
| 9,577,454 B2* | 2/2017 | Seymour | H02J 7/0013 |
| 9,643,729 B2* | 5/2017 | Walter-Robinson | B64D 41/00 |
| 9,744,960 B2* | 8/2017 | Kodawara | B60W 10/26 |
| 10,170,921 B2* | 1/2019 | Yechieli | H02J 3/14 |
| 10,189,464 B2* | 1/2019 | Aridome | B60W 30/192 |
| 10,211,667 B2* | 2/2019 | Landis | H02J 7/34 |
| 10,263,443 B2* | 4/2019 | Colavito | G08B 21/182 |
| 10,286,801 B2* | 5/2019 | Shimizu | B60L 53/68 |
| 10,299,216 B1* | 5/2019 | Wengreen | G08G 1/202 |
| 10,377,260 B2* | 8/2019 | Donnelly | B60L 53/36 |
| 10,389,143 B2* | 8/2019 | Deshpande | B60L 50/60 |
| 10,445,953 B1* | 10/2019 | Herron | H02J 7/00 |
| 10,464,547 B2* | 11/2019 | Park | B60W 50/14 |
| 10,483,792 B2* | 11/2019 | Seberger | H02J 9/061 |
| 10,536,011 B2* | 1/2020 | Shlemenzon | H02J 7/0029 |
| 10,566,833 B2* | 2/2020 | Tsai | H02J 7/0068 |
| 2012/0176095 A1 | 7/2012 | Okuda et al. | |
| 2017/0207639 A1 | 7/2017 | Christfort | |

* cited by examiner

TRANSIENT BATTERY POWER MANAGEMENT

TECHNICAL FIELD

The present disclosure is generally related to a system for managing transient battery power for an electrified vehicle.

BACKGROUND

Electrified vehicles including hybrid-electric vehicles (HEVs) and battery electric vehicles (BEVs) rely on a traction battery to provide power to a traction motor for propulsion. Traction batteries are usually high voltage batteries and are capable of delivering high power rates for short periods of time. However, frequent high power discharges may cause battery cell degradation and negatively affect the lifespan of the battery. A battery electric control module may be used to control various operations of the traction battery.

SUMMARY

In one or more illustrative embodiments, a vehicle includes a battery, and a processor programmed to set a short-term power limit for the battery that corresponds to an amount of charge of the battery and that defines a discharge limit for the battery. The processor also charges the battery responsive to an output power of the battery being less than a first threshold and depletes the battery responsive to the output power being greater than a second threshold.

In one or more illustrative embodiments, a vehicle includes a controller programmed to, responsive to detecting an output power of a battery greater than a long-term power limit, deplete the battery at a depleting rate, responsive to detecting the output power less than the long-term power limit, charge the battery at a filling rate less than the depleting rate, and adjust a short-term power limit defining a discharge limit for the battery according to a charge of the battery.

In one or more illustrative embodiments, a method includes by a controller, responsive to detecting an output power of a battery greater than a long-term power limit, depleting the battery at a depleting rate, responsive to detecting the output power less than the long-term power limit, charging the battery at a filling rate less than the depleting rate, and adjusting a short-term power limit defining a discharge limit for the battery according to a charge of the battery.

BRIEF DESCRIPTION OF THE DRAWINGS

For a better understanding and to show how it may be performed, embodiments thereof will now be described, by way of non-limiting example only, with reference to the accompanying drawings, in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system and method for controlling a vehicle battery. More specifically, the present disclosure proposes a system and method for imposing a power limit on a traction battery of an electric powered vehicle.

Figure 1:
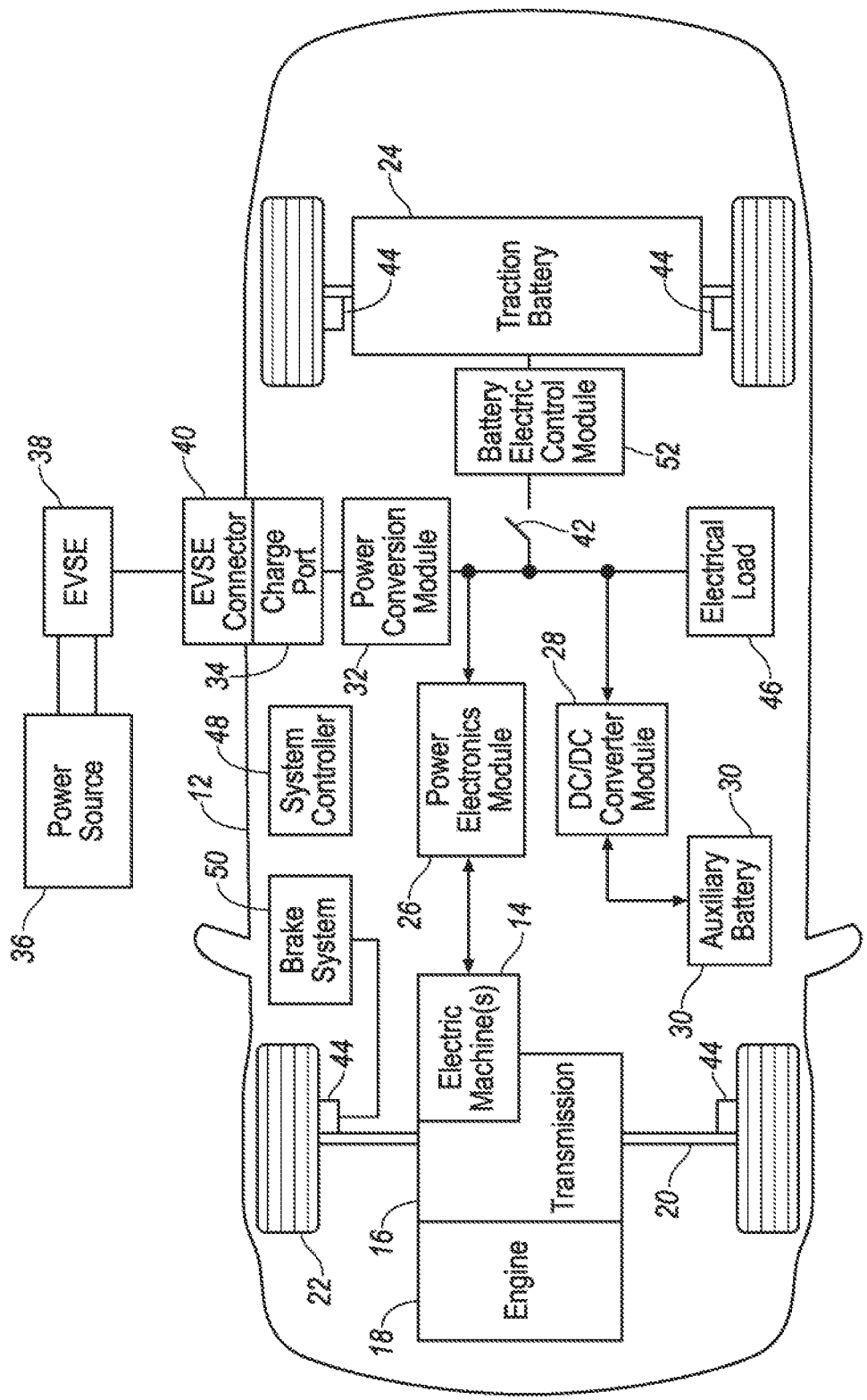
FIG. 1 illustrates an example block topology of a hybrid vehicle illustrating drivetrain and energy storage components of one embodiment of the present disclosure.

FIG. 1 illustrates a plug-in hybrid-electric vehicle (PHEV). A plug-in hybrid-electric vehicle 12 may comprise one or more electric machines (a.k.a. electric motors) 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 may provide propulsion and deceleration capability when the engine 18 is turned on or off. The electric machines 14 may also act as generators and may provide fuel economy benefits by recovering energy that would be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that may be used by the electric machines 14. A vehicle battery pack 24 may provide a high voltage DC output. The traction battery 24 may be electrically coupled to one or more battery electric control module (BECM) 52. The BECM may be provided with one or more processors and software applications configured to monitor and control various operations of the traction battery 24. The traction battery 24 may be further electrically coupled to one or more power electronics modules 26. The power electronics module 26 may also be referred to as a power inverter. One or more contactors 42 may isolate the traction battery 24 and the BECM 52 from other components when opened and couple the traction battery 24 and the BECM 52 to other components when closed. The power electronics module 26 may also be electrically coupled to the electric machines 14 and provide the ability to bi-directionally transfer energy between the traction battery 24 and the electric machines 14. For example, a traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle may include a DC/DC converter module 28 that converts the high voltage DC output of the traction battery 24 to a low voltage DC supply that is compatible with other low-voltage vehicle loads. An output of the DC/DC converter module 28 may be electrically coupled to an auxiliary battery 30 (e.g., 12V battery). Other high-voltage loads 46, such as compressors and electric heaters, may be coupled to the high-voltage output of the traction batter 24.

The vehicle 12 may be an electric vehicle or a plug-in hybrid vehicle in which the traction battery 24 may be recharged by an external power source 36. The external power source 36 may be a connection to an electrical outlet. The external power source 36 may be an electrical power distribution network or grid as provided by an electric utility company. The external power source 36 may be electrically coupled to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. A system controller 48 may be present to coordinate the operation of the various components.

Figure 2:
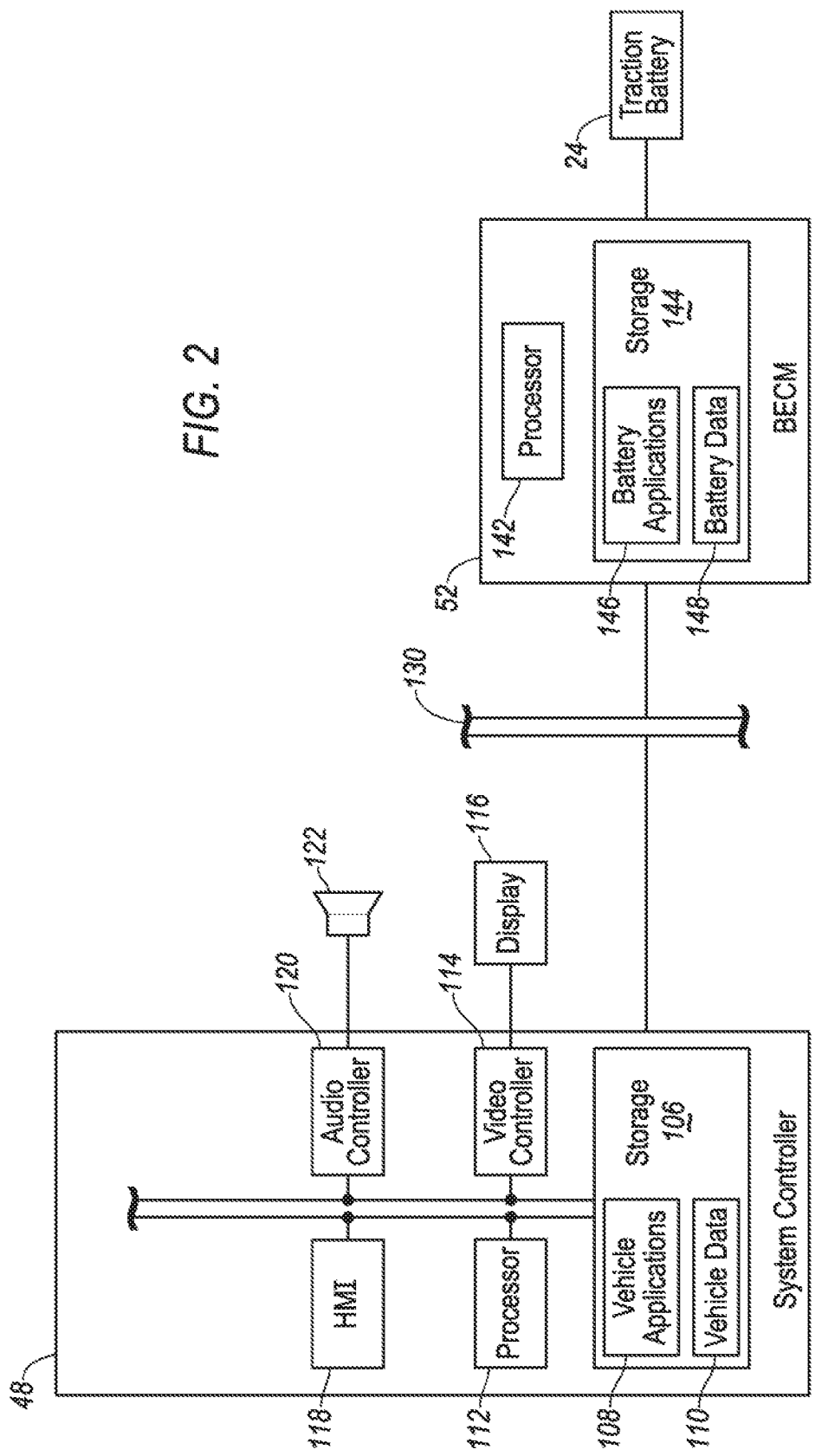
FIG. 2 illustrates an example diagram illustrating a system controller and a battery electric control module of one embodiment of the present disclosure.

Referring to FIG. 2, an example diagram for a battery control system including the system controller 48 and the BECM 52 is illustrated. The system controller 48 may include one or more processors 112 configured to perform instructions, commands, and other routines in support of the processes described herein. For instance, the system controller 48 may be configured to execute instructions of vehicle applications 108 to provide features such as navigation, satellite radio decoding, and vehicle power management. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The system controller 48 may be provided with various features allowing the vehicle occupants/users to interface with the system controller 48. For example, the system controller 48 may receive input from human-machine interface (HMI) controls 118 configured to provide for occupant interaction with the vehicle 12. As an example, the system controller 48 may interface with one or more buttons (not shown) or other HMI controls configured to invoke functions on the system controller 48 (e.g., steering wheel audio buttons, a push-to-talk button, instrument panel controls, etc.).

The system controller 48 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The system controller 48 may also drive or otherwise communicate with one or more speakers 122 configured to provide audio output to vehicle occupants by way of an audio controller 120.

The system controller 48 may be further configured to communicate with various components of the vehicle 12, such as the BECM 52, via one or more in-vehicle network 130. The in-vehicle network 130 may include, but not limited to, one or more of a CAN, an ethernet network, a media oriented system transport (MOST), as some examples.

The BECM 52 may include a processor 142 configured to perform instructions, commands, and other routines in support of the processes described herein. For instance, the BECM 52 may be configured to execute instructions of battery application 146 to provide features such as charging, discharging, virtual energy bucket management, and other battery management. Such instructions and other data may be maintained in a non-volatile manner using a variety of types of computer-readable storage medium 144. The BECM 52 may be configured to control various operations of the traction battery 24. For instance, the BECM 52 may be configured to perform bucket battery energy and power control to the traction battery 24 to increase the lifespan of the traction battery 24.

Figure 3A:
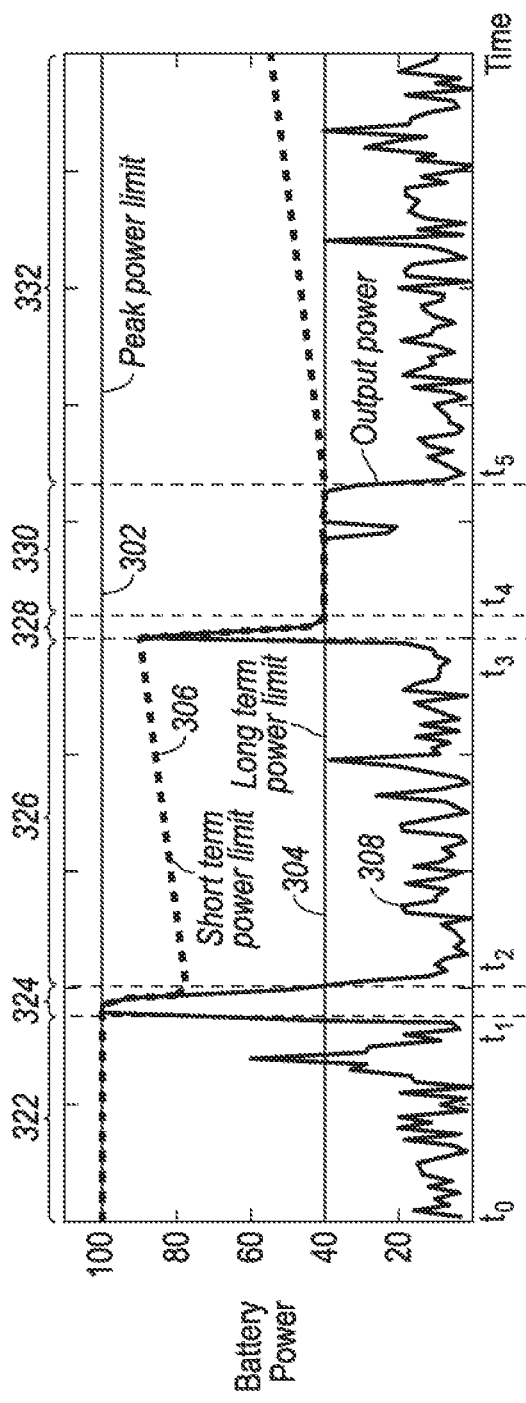
FIGS. 3A and 3B illustrate example diagrams for battery power and bucket of energy of one embodiment of the present disclosure.
Figure 3B:
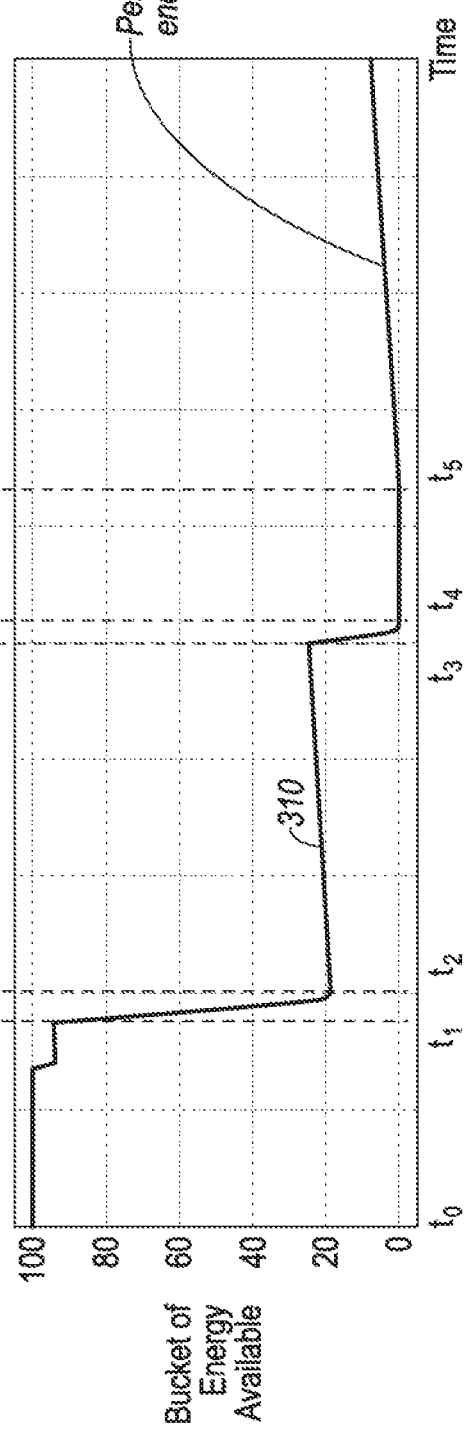

Referring to FIGS. 3A and 3B, signal diagrams illustrating virtual energy bucket management for traction battery 24 are illustrated. Referring to FIG. 3A, a peak power limit 302 sets a maximum discharge power for the battery 24. In other words, the discharge power for the battery 24 may not go beyond the peak power limit 302 due to battery design constraints. A long-term power limit 304 may be manually set by the BECM 52 for controlling purposes. As a non-limiting example, the long-term power limit 304 may be set around 40% of the peak power limit 302 as illustrated in FIG. 3A. The long-term power limit may be used as an energy bucket fill/deplete (charge/discharge) threshold. A virtual energy bucket 310 (referring to FIG. 3B) of the traction battery may fill/charge and increase when the output power 308 from the traction battery 24 used by various components of the vehicle 12 is below the long-term power limit 304. And the virtual energy bucket 310 may deplete/discharge and decrease when the output power 308 used is equal to or above the long-term power limit 304.

The BECM 52 may further set a short-term power limit 306 to further control the discharge of the traction battery 24. The short-term power limit may generally fill and deplete corresponding to the virtual energy bucket 310. The short-term power limit 306 may be used as a virtual "not to exceed" limit for the traction battery 24 to discharge. In other words, the BECM 52 may be configured to limit the maximum discharge power to the short-term power limit instead of the peak power limit 302. For instance, the short-term power limit 306 may vary between the peak power limit 302 and the long-term power limit 304 generally corresponding to the virtual energy bucket 310.

As illustrated, FIG. 3A and FIG. 3B correspond to each other in time. In time period 322 between $t_0$ and $t_1$, the output power 308 used by the vehicle 12 is generally below the long-term power limit 304 used as a threshold for fill/deplete the energy bucket 310. Since the virtual energy bucket 310 is about full, the BECM 52 does not allow the virtual energy bucket 310 to fill further beyond the full capacity. In time period 324 between $t_1$ and $t_2$, as the output power 308 used by the vehicle 12 dramatically increases above the long-term power limit 304, the virtual energy bucket 310 starts to dramatically deplete correspondingly from around full to around 20%. Meanwhile, the short-term power limit 306 decreases corresponding to the virtual energy bucket 310 from around full to around 80% of the peak power limit. Since the short-term power limit 306 sets a "not to exceed" limit, the output power 308 also decreases corresponding to the short-term power limit 306. It is noted that the percentage of various signals used in the present example are merely examples for illustrative purposes and other values may be used under substantially the same principle. The percentage of the virtual energy bucket 310 and the percentage of the short-term power limit 306 does not have to match due to various configurations although the filling and depleting of the two signals generally correspond to each other.

In time period 326 between $t_2$ and $t_3$, the virtual energy bucket 310 refills while the output power 308 falls below the long-term power limit 304. While the energy bucket 310 is filling, the corresponding short-term power limit 306 increases correspondingly. In time period 328, between $t_3$ and $t_4$, the output power 308 rises and exceeds the long-term power limit 304 until the energy bucket 310 is completely drain at around $t_4$. The short-term power limit 306 converges to long-term power limit 304. In time period 330, the maximum output power 308 is limited to the short-term power limit 306 although the vehicle 12 may request for more power not exceeding the peak power limit 302. Since the output power 308 is still at around the long-term power limit 304, the energy bucket is not filling until $t_5$, when the output power 308 significantly drops below the long-term power 304. The virtual energy bucket 310 starts to fill at around $t_5$. Corresponding to the filling of the virtual energy bucket 310, the short-term power limit 306 starts to increase from the long-term power limit 304 allowing more power to be drawn from the traction battery 24.

Figure 4:
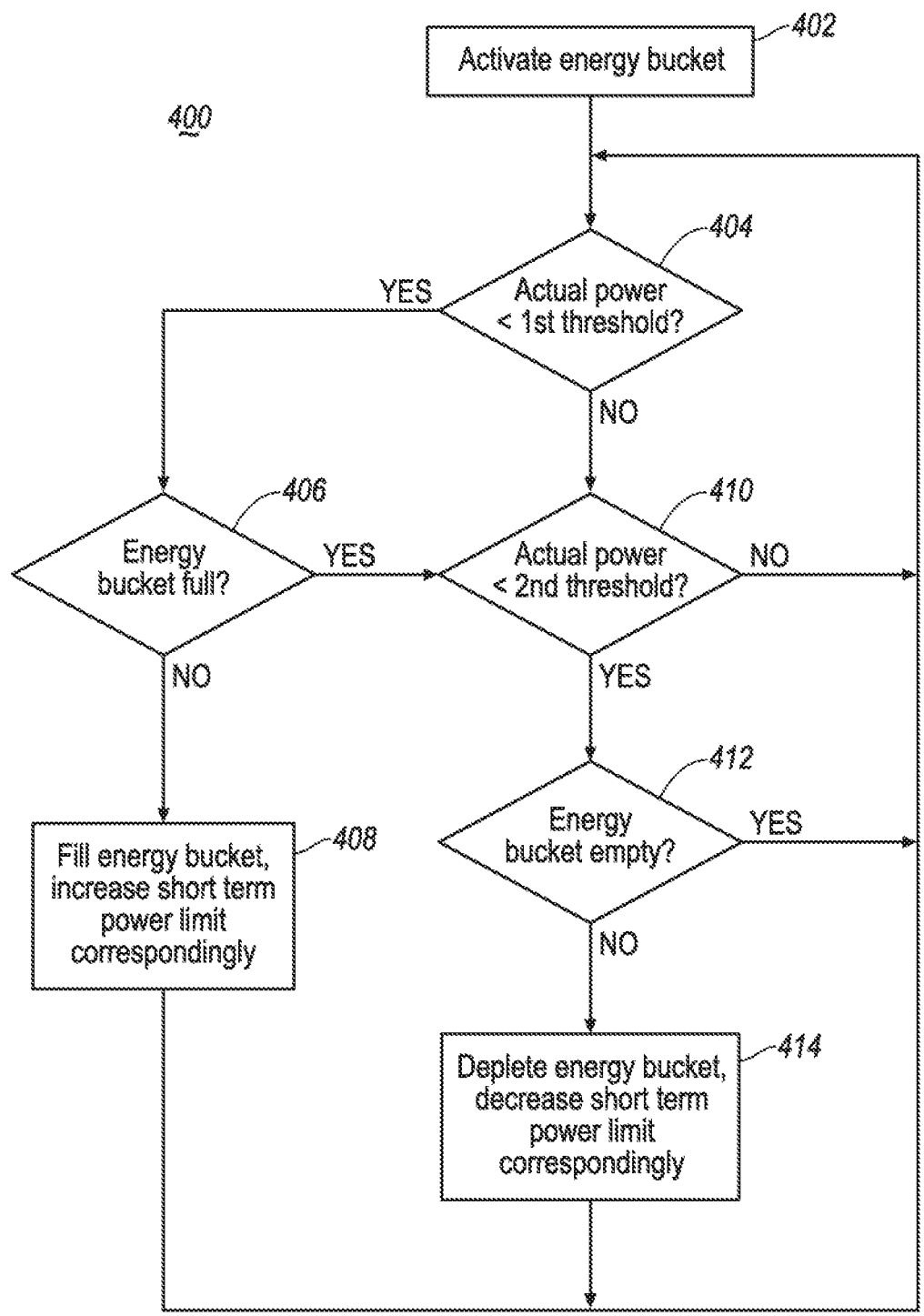
FIG. 4 illustrates an example flow diagram for an energy bucket management process of one embodiment of the present disclosure.

Referring to FIG. 4, a flow diagram for a virtual energy bucket management process of one embodiment of the present disclosure is illustrated. Compared to the example illustrated with reference to FIGS. 3A and 3B, the present example uses two thresholds to decide the filling and depleting of the energy bucket respectively.

At operation 402, the BECM 52 activates the virtual energy bucket settings for the traction battery 24 and initiates the virtual energy bucket. The virtual energy bucket data may be stored in the storage 144 as a part of the battery data. As an example, the initial virtual energy bucket level may be set corresponding to the state of charge of the traction battery 24. At operation 404, the BECM 52 determines whether the output power 308 consumed by the vehicle 12 is below a first threshold. The first threshold may be any value below the peak power limit of the traction battery 24. Responsive to a positive answer at operation 404, the process proceeds to operation 406 to determine whether the current energy bucket is full. If the current virtual energy bucket is not full, the BECM 52 fills the energy bucket at a predefined rate and increases the short-term power limit correspondingly. For instance, the predefined rate for filling the virtual energy bucket may be a fix rate. Alternatively, the predetermined rate may be a flexible rate dynamically adjusted by the BECM 52 based on various factors including, for instance, the state of charge of the traction battery 24, current output power 308, charging/discharging status of the traction battery 24, battery life cycle, battery condition, and etc.

If the answer for operation 404 is a no or the answer for operation 406 is a yes, the process proceeds to operation 410, and the BECM 52 determines whether the output power of the vehicle 12 is above a second threshold. As an example, the second threshold may be the same, greater or less than the first threshold depending on various specific configurations. Both the first and second thresholds may be dynamically adjusted by the BECM 52 depending on various factors. As a few non-limiting examples, the first and second thresholds may be adjusted based on the state of charge of the traction battery 24, current output power, charging/discharging status of the traction battery 24, driving condition (e.g. highway, off-road and etc.), distance from the nearest available fueling station (e.g. determined by GPS) and etc.

If the answer for operation 410 is a yes, the process proceeds to operation 412 and the BECM 52 determines whether the virtual energy bucket is empty. If the virtual energy bucket is not empty, the process proceeds to operation 414, and the BECM 52 depletes the energy bucket at a predefined rate, and decreases the short-term power limit correspondingly. The predefined depleting rate for the energy bucket may be a fix rate. Alternatively, the predetermined rate may be a flexible rate dynamically adjusted based on various factors as discussed above. The predefined depleting rate may be generally faster than the predefined filling rate for the energy bucket for energy preservation purposes.

The operation of the energy bucket management may be manually controlled by the vehicle user via HMI 118. For instance, the vehicle user may manually switch on/off, and adjust the power thresholds of the energy bucket setting via the HMI 118. Video and audio feedback may be provided to the user via the display 116 and the speaker 122.

Although the processes illustrated in FIGS. 3 and 4 are described using the BECM 52, it is noted that the processes may be implemented by other components on-board or off-board the vehicle 12. For instance, the processes managing the energy bucket and controlling the operation of the traction battery 24 may be implemented by the system controller 48, the power electronics module 26, and/or other components of the vehicle 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a battery; and
    a processor programmed to set a short-term power limit for the battery that corresponds to an amount of charge of the battery and that defines a discharge limit for the battery, to charge the battery responsive to an output power of the battery being less than a first threshold, and to deplete the battery at the discharge limit responsive to the output power being greater than a second threshold.

2. The vehicle of claim 1, wherein the processor is programmed to charge the battery at a slower rate than to deplete the battery.

3. The vehicle of claim 1, wherein the processor is programmed to charge the battery at a rate based on state of charge of the battery, current output power, charging/discharging status of the battery, battery life cycle, or battery condition.

4. The vehicle of claim 1, wherein the processor is programmed to deplete the battery at a rate based on state of charge of the battery, current output power, charging/discharging status of the battery, battery life cycle, or battery condition.

5. The vehicle of claim 1, wherein the processor is further programmed to adjust the first threshold or the second threshold based on state of charge of the battery, current output power, charging/discharging status of the battery, driving condition, or distance from a nearest available fueling station.

6. The vehicle of claim 1, wherein the first power threshold is equal to the second power threshold.

7. The vehicle of claim 1, wherein the short-term power limit has a minimum value equal to the second power threshold.

8. A vehicle comprising:
    a controller programmed to, responsive to detecting an output power of a battery greater than a long-term power limit, deplete the battery at a depleting rate, responsive to detecting the output power less than the long-term power limit, charge the battery at a filling rate less than the depleting rate, and adjust a short-term power limit defining a discharge limit for the battery according to a charge of the battery.

9. The vehicle of claim 8, wherein the depleting rate is fixed.

10. The vehicle of claim 8, wherein the filling rate is fixed.

11. The vehicle of claim 8, wherein the controller is further programmed to adjust the filling rate or the depleting rate based on state of charge of the battery, current output power, charging/discharging status of the battery, battery life cycle, or battery condition.

12. The vehicle of claim 8, wherein the controller is further programmed to adjust the long-term power limit based on state of charge of the battery, current output power, charging/discharging status of the battery, driving condition, or distance from a nearest available fueling station.

13. The vehicle of claim 8, wherein the short-term power limit has a minimum value equal to the long-term power limit.

14. A method comprising:
    by a controller,
        responsive to detecting an output power of a battery greater than a long-term power limit, depleting the battery at a depleting rate,
        responsive to detecting the output power less than the long-term power limit, charging the battery at a filling rate less than the depleting rate, and
        adjusting a short-term power limit defining a discharge limit for the battery according to a charge of the battery.

15. The method of claim 14, wherein the depleting rate is fixed.

16. The method of claim 15, wherein the filling rate is fixed.

17. The method of claim 14, wherein the filling rate is less than the depleting rate.

18. The method of claim 14, further comprising adjusting the filling rate or the depleting rate based on state of charge of the battery, current output power, charging/discharging status of the battery, battery life cycle, or battery condition.

* * * * *